US006404587B1

(12) United States Patent
Chaug et al.

(10) Patent No.: US 6,404,587 B1
(45) Date of Patent: Jun. 11, 2002

(54) SELECTIVE GAP LAYER DEPOSITION ON THE CLOSURE OF A MAGNETIC RECORDING HEAD

(75) Inventors: Yi-Shung Chaug, Boulder, CO (US); Thomas A. Carroll, Minnetonka, MN (US); Mark Snyder; R. Scott Winslow, both of Broomfield, CO (US)

(73) Assignee: Storage Technology Corporation, Louisville, CO (US)

( * ) Notice: Subject to any disclaimer, the term of this patent is extended or adjusted under 35 U.S.C. 154(b) by 1073 days.

(21) Appl. No.: 08/584,118

(22) Filed: Jan. 11, 1996

(51) Int. Cl.[7] .................................................. G11B 5/23
(52) U.S. Cl. ...................................... 360/119; 360/121
(58) Field of Search ................................ 360/119, 121, 360/126

(56) References Cited

U.S. PATENT DOCUMENTS 5,394,285 A   2/1995 Sundaram .................... 360/121

FOREIGN PATENT DOCUMENTS

JP            2-29910   *  1/1990   .................. 360/119

* cited by examiner

Primary Examiner—A. J. Heinz
(74) Attorney, Agent, or Firm—Brooks & Kushman P.C.

(57) ABSTRACT

The tape head of the present invention has a substrate and a closure separated by a gap. The tape head is of the type having a flat closure module. The gap layers disposed in the gap include a recording track layer and a patterned gap layer. The recording track layer has a nonplanar topography along said gap that is defined by at least one of a read track and a write track. The patterned gap layer is disposed over substantially an entire surface of the gap side surface of the closure. The patterned gap layer is etched so as to selectively define a topography along said gap that inversely corresponds to the nonplanar topography of the recording track layer. As a result, the patterned gap layer fills any localized air space that would otherwise exist in the gap due to the nonplanar topography of the recording track layer. By filling the localized air space in the gap, microchipping is reduced and/or eliminated in the tape head of the present invention.

11 Claims, 3 Drawing Sheets

SELECTIVE GAP LAYER DEPOSITION ON THE CLOSURE OF A MAGNETIC RECORDING HEAD

BACKGROUND OF THE INVENTION

1. Field of the Invention

The invention relates to a magnetic recording head. More particularly, the invention relates to a magnetic recording head having a patterned gap layer along a gap in the head to reduce localized empty space in the gap, and a method of making the same.

2. Description of the Related Art

There has been a great demand for increasing the data throughput of magnetic tape transport systems used in conjunction with high-speed digital computers. In order to utilize the high-speed capabilities of these computers, it is necessary to increase the amount of data stored on a magnetic tape and to increase the speed at which the data is written to or retrieved from the magnetic tape media.

To increase the data storage capacity of the tape transport systems, the areal density of the magnetic tape media which stores the data must be increased. Areal density is defined as the number of units of data stored in a unit area of the tape. Areal density is characterized by two attributes: linear density and track density. To increase the areal density of a magnetic tape media, one must increase either or both, the linear density and track density of the magnetic tape.

Track density is defined as the number of data tracks per unit width of magnetic tape. Two characteristics associated with track density are track width, defined as the actual width of an individual data track; and track pitch, defined as the distance from the center of one data track to the center of a neighboring data track. As magnetic tape head size decreases, the track pitch can be decreased and track width is decreased, thereby increasing track density.

An example of the increasing track density can be seen by comparing the StorageTek 4480 18-track tape drive system with the StorageTek 4490 36-track tape drive system. Both systems support a half-inch magnetic tape contained in a 3480-type cartridge. The magnetic tape used in the 4480 18-track tape drive system has a track pitch of approximately 630 $\mu$m and a track width of approximately 540 $\mu$m. The magnetic tape used in the 4490 36-track tape drive system has a track pitch of approximately 315 $\mu$m and a track width of approximately 285 $\mu$m. Thus, the track width of the 36-track system is approximately half the track width of the 18-track system. Also, the distance between data tracks in the 36-track system is approximately a third of the distance between the data tracks in the 18-track system.

With high track density magnetic recording heads such as in the 36-track system, because the distance between data tracks is reduced, slight imperfections in the heads will have a more significant impact on the performance and/or the quality of the tape heads. Naturally, a small imperfection in a small area will have a greater impact and be more significant than the same small imperfection in a larger area.

Moreover, in magnetic recording heads, especially magneto-resistive thin film tape heads, a gap length between a substrate and a closure is one of the critical parameters in determining the recording performance of the tape head. Currently, the gap length is controlled by the thickness of the gap layers deposited in the gap between the substrate and the closure. This gap length should be approximately equal to the thickness of the deposited gap layers, barring any contamination. With a magnetic recording head having a flat closure, the substrate has read and/or write tracks disposed on and extending from a gap side surface of the substrate to form the recording module. Then, the recording module is bonded to the flat surface on the closure. After closing or bonding the closure and the recording module, the tape head is ground and lapped such that a smooth contoured surface is obtained.

SUMMARY OF THE INVENTION

The tape head of the present invention has a substrate and a closure separated by a gap. The gap layers disposed in the gap include a first gap layer, which comprises a recording track layer deposited on the substrate and a patterned gap layer deposited on a flat surface of the closure. The first gap layer has a first nonplanar topography along a gap side surface of the first gap layer, which would normally create localized air space along the gap. However, in the present invention, the patterned gap layer deposited on the substantially planar surface of the closure has a second topography along the gap side surface of the patterned gap layer that inversely corresponds to the first nonplanar topography. As a result, the gap is substantially filled by the first gap layer and the patterned gap layer. By filling the localized air space in the gap, microchipping is reduced and/or eliminated in the tape head of the present invention.

Specifically, in the present invention, the first gap layer has a first nonplanar topography along the gap that includes recesses having a first thickness. The patterned gap layer has a second topography along said gap that inversely corresponds to said first nonplanar topography. Accordingly, the patterned gap layer is etched to define portions corresponding to the recesses and having a second thickness substantially equal to first thickness so as to substantially completely fill the recesses and thereby the gap.

The present invention further relates to a method of making a multi-track tape head for at least one of reading from and writing to a medium. The method comprises the steps of: (1) forming a recording track on a substrate, where the recording track has a first nonplanar topography along a gap side surface of the recording track; (2) applying a gap layer to substantially an entire surface of a gap side surface of a closure, where the gap side surface is substantially planar; (3) etching the gap layer to form a patterned gap layer with a second topography inversely corresponding to the first nonplanar topography; and (4) bonding the substrate and the closure together.

It is an advantage of the invention to reduce or eliminate the air space along the gap.

It is a further advantage of the invention to substantially completely fill the gap of the tape head.

It is a further advantage of the invention to reduce or eliminate microchipping in the gap of a tape head.

It is a further advantage of the invention that the production of debris, which can get sucked into the gap of the tape head and cause corrosion, can be reduced or eliminated.

It is a further advantage of the invention to provide a tape head having improved performance.

BRIEF DESCRIPTION OF THE FIGURES

The present invention will be described with reference to the accompanying drawings.

DETAILED DESCRIPTION OF THE PREFERRED EMBODIMENTS

Figure 1:
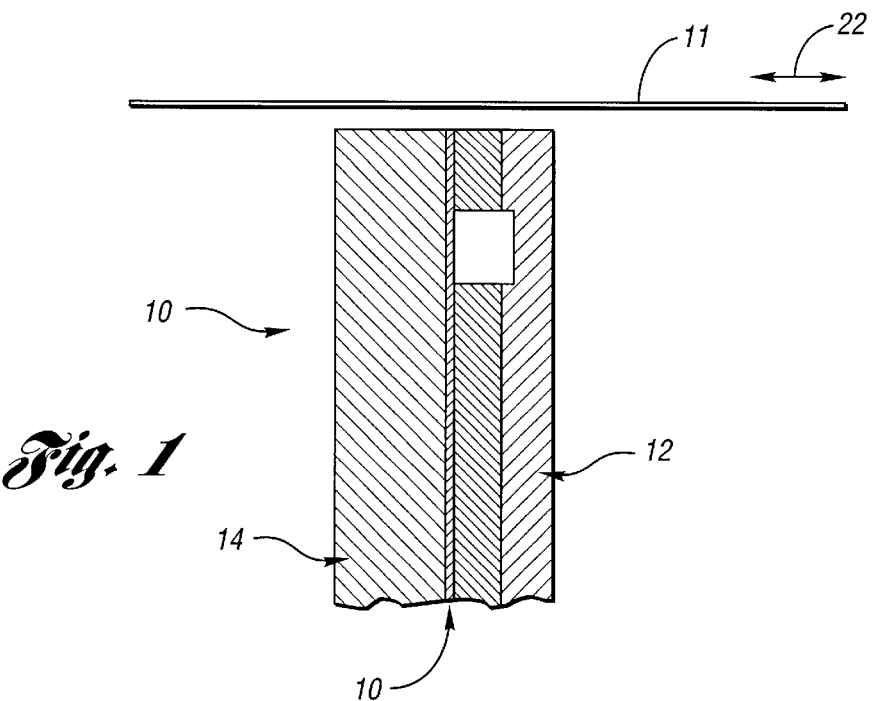
FIG. 1 is a cross-sectional view of the magnetic tape head and medium in accordance with the present invention.

The invention relates to a magnetic tape head as shown generally in cross section at 10 in FIG. 1. Tape head 10 includes a closure 12 and a substrate 14 separated by a gap 20. A medium such as a magnetic recording medium or a magnetic tape 11 passes over a front end of tape head 10. A magnetic field at a front end of gap 20 of tape head 10 enables data to be read from and written to the medium. Movement of the magnetic tape along the front end of tape head 10 is illustrated by bi-directional arrow 22.

Figure 2:
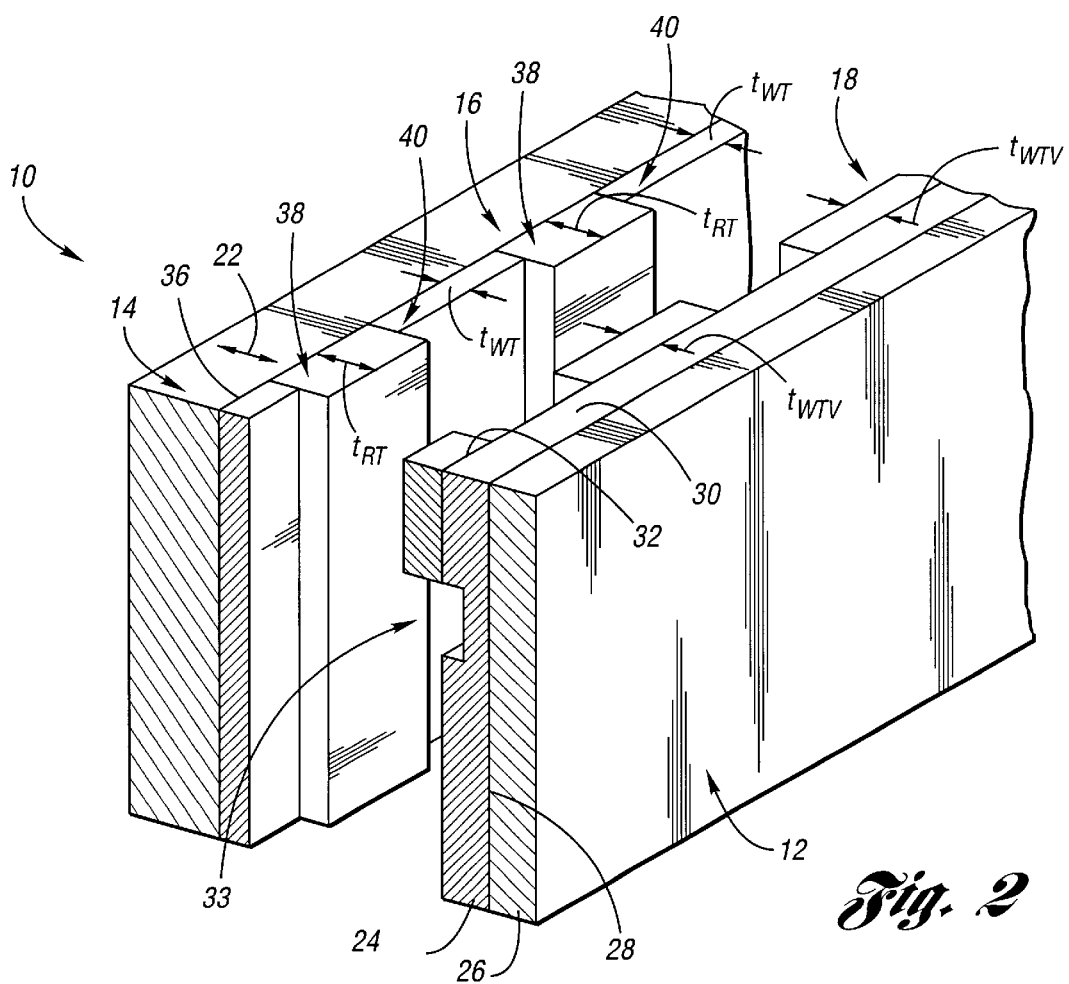
FIG. 2 is an isometric view of the magnetic head of the present invention where the closure is separated from the substrate and where the elements of the tape head are shown at a high-level.
Figure 3:
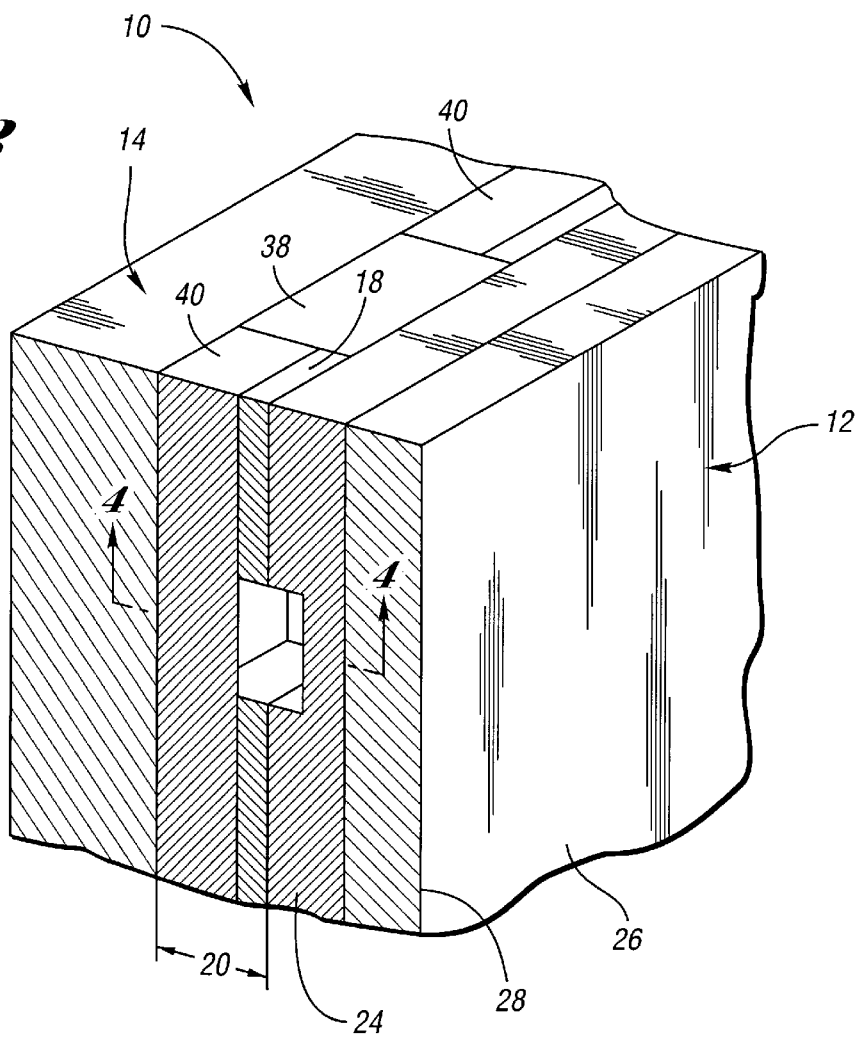
FIG. 3 is a cross-sectional view taken through the magnetic head shown in FIG. 2 showing the patterned gap layer.

For purposes of illustration and the following discussion, FIG. 2 shows closure 12 pulled back from substrate 14 to expose gap layers in gap 20. In a final configuration, closure 12 is bonded to substrate 14 such that closure 12 and substrate 14 are separated by gap 20. Gap 20 is defined between a gap side surface 36 of substrate 14 and a gap side surface 32 of closure 12. Gap 20 has a thickness that is equal to the amount of separation between gap side surface 36 of substrate 14 and gap side surface 32 of closure 12. The thickness of gap 20 is substantially equal to the thickness of the gap layers deposited in gap 20. A relative view of gap 20 in tape head 10 is shown in FIG. 3, which will be discussed in greater detail in the following.

Closure 12 serves a generally mechanical function in tape head 10 and is intended to be bonded with substrate 14. To improve the bonding between substrate 14 and closure 12, closure 12 includes a C-core 33. Specifically, C-core 33 is machined in gap side surface 32 so that an adhesive can flow between substrate 14 and closure 12, thereby improving the bond between substrate 14 and closure 12.

As shown, closure 12 comprises a first portion 24 of magnetic material and a second portion 26 of magnetic material. The magnetic material may comprise, for example, ferrite. An insulating layer 28 is interposed between first and second portions 24 and 26. Insulating layer 28 may comprise an insulator material, such as, glass or ceramic. Closure module 12 includes a top surface 30 at a front end of tape head 10 for being disposed adjacent to the medium. Gap side surface 32 is disposed on a side of closure 12 adjacent to gap 20. Gap side surface 32 is substantially flat and defines a planar surface.

Substrate 14 as shown is of a generally block-shaped configuration. Substrate 14 has a top surface 34 at the front end of tape head 10 for being disposed adjacent to tape 11. The gap side surface 36 of substrate 14 on a side of substrate 14 adjacent to gap 20.

Gap layers 25 (FIG. 4) are deposited in gap 20. Gap layers 25 include a recording track layer shown generally at 16 deposited on substrate 14 and a patterned gap layer 18 deposited on the planer gap side surface 32 of closure 12. Recording track layer 16 is deposited on substrate 14 so as to extend into gap 20. In particular, recording track layer 16 comprises read tracks 38 and/or write tracks 40. Read tracks 38 and write tracks 40 are deposited and patterned on substrate 14 in accordance with conventional thin film deposition techniques.

Read tracks 38 have a thickness $t_{RT}$, which is equal to the thickness of gap 20 as shown. Write tracks 40 have a thickness $t_{WT}$, which is less than the thickness $t_{RT}$. Because read tracks 38 are thicker than write tracks 40, read tracks 38 extend into gap 20 more than write tracks 40. Because of the variation in the thicknesses between read tracks 38 and write tracks 40 and thereby the variation in the extent to which the read tracks 38 and write tracks 40 extend into gap 20, recording track layer 16 has a gap side surface that has a nonplaner topography. In particular, the nonplanar topography has recesses in the gap side surface of the nonplanar topography where write tracks 40 are deposited. More particularly, the recesses in the topography of recording track layer 16 is interposed between a gap side surface of write tracks 40 and gap side surface 32 of closure 12.

Because of the nonplanar topography of recording track layer 16, applicants have found that when substrate 14 is bonded with flat closure 12, there is localized empty space along gap 20, in particular, there is localized empty space in these recesses. This localized empty space, is filled only with air. Therefore, this localized air space provides no support for the closure during grinding and lapping, as well as during use of the tape head.

This is due in part to the polycrystalline materials, such as ferrite, that are used to make substrate 14 and closure 12. These polycrystalline materials have grain boundaries between the individual grains that are weaker than the grain itself. Thus, when tape head 10 is ground, lapped or used over time, microchipping occurs along the grain boundaries adjacent to this localized empty space. Microchipping occurs when very small grains within the closure break along the grain boundaries between the grains at the gap location. This microchipping in the gap causes the gap length to vary across the tape head and deteriorates tape head performance. This causes complications in performance and may even cause element corrosion and head failure. As well, during use of the tape head, debris or aqueous contaminants from the tape may be introduced into this air space in the gap.

To fill this localized air space in gap 20, a patterned gap layer 18 is selectively deposited on gap side surface 32 of closure 12. Specifically, patterned gap layer 18 also has a topography on a gap side surface thereof, however, the topography of patterned gap layer 18 inversely corresponds to the nonplanar topography of recording track layer 16. As a result, when substrate 14 is bonded with closure 12, this localized empty space is filled. Therefore, microchipping on the structure surrounding the localized air space is reduced or eliminated.

In particular, in the present invention, patterned gap layer 18 as shown in FIG. 2, is selectively etched, as will be disclosed in greater detail below, to form the topography of patterned gap layer 18 that inversely corresponds to the nonplanar topography of recording track layer 16. More particularly, patterned gap layer 18 is etched so as to form portions having a thickness $t_{WTV}$ substantially equal to a thickness of the recesses and having a shape and size inversely proportional to a shape and size of the recesses.

FIG. 3 shows substantially the cross-sectional portion of tape head 10 shown in FIG. 1, however, closure 12 is not pulled back from substrate 14. Accordingly, FIG. 3 illustrates how patterned gap layer 18 fills the recesses in recording track layer 16, which would otherwise have comprised localized empty space.

Figure 4:
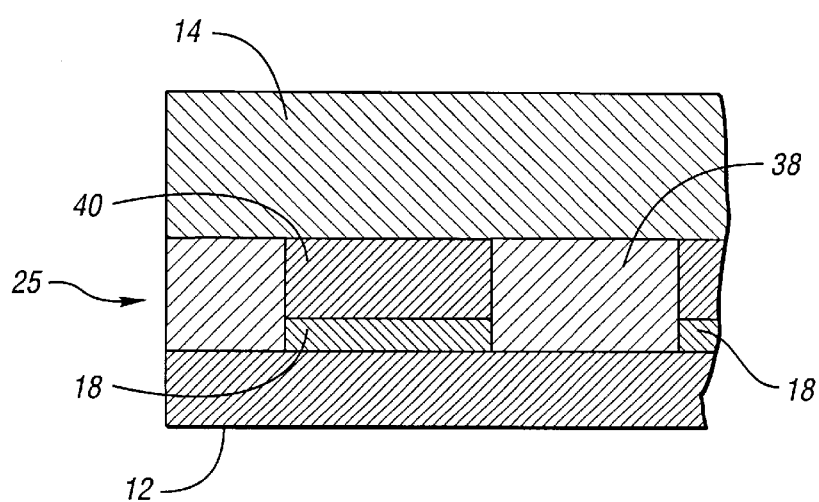
FIG. 4 shows a cross-section of the gap layers taken along line 4—4 shown in FIG. 3.

FIG. 4 shows a cross-sectional view of gap layers 25 in gap 20 taken along line 4—4 in FIG. 3.

Figure 5:
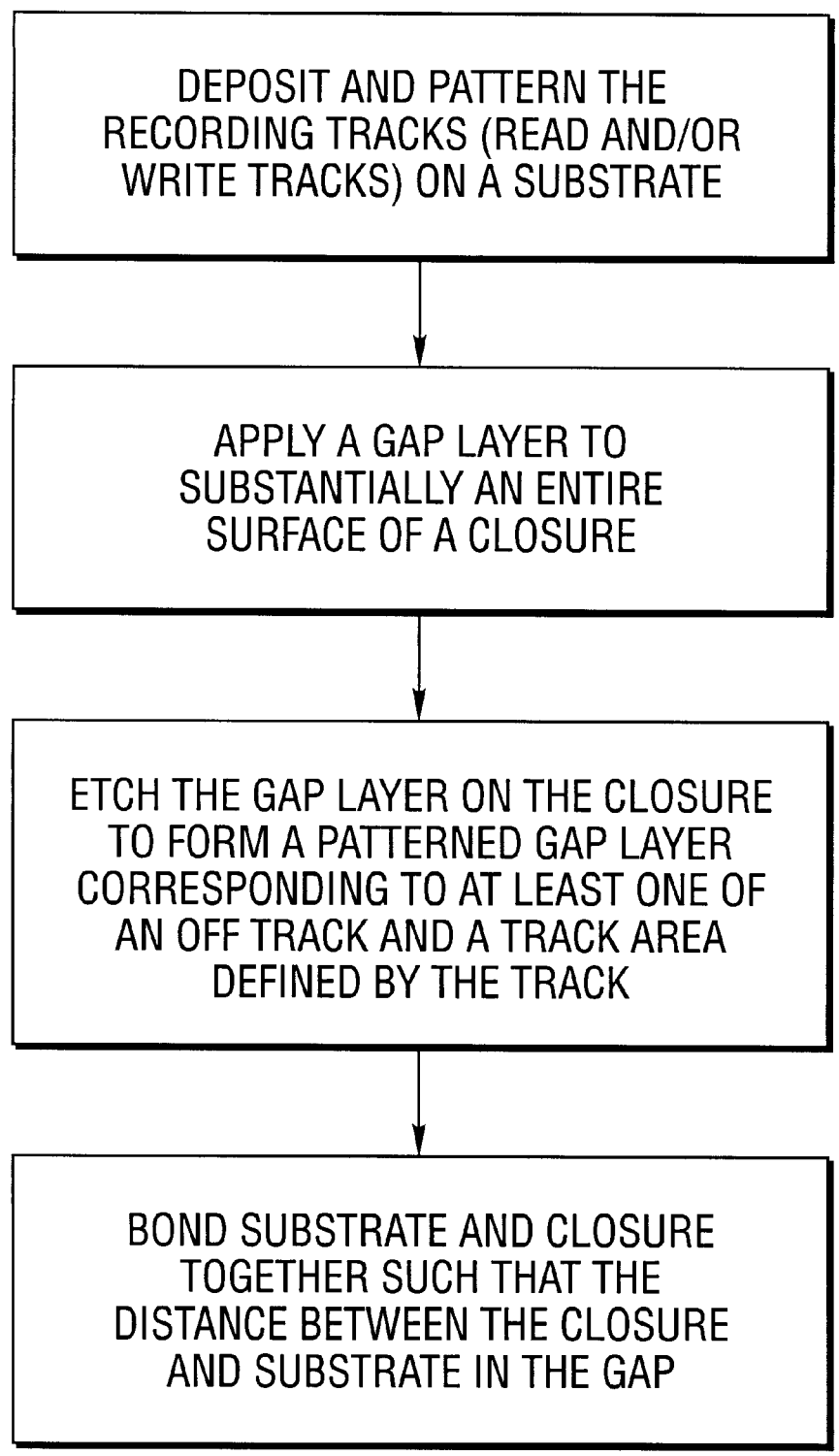
FIG. 5 shows steps for producing a tape head in accordance with the present invention.

FIG. 5 illustrates the steps of manufacturing tape head 10 in accordance with the present invention. To begin, recording track layer 16 is deposited and patterned in accordance with conventional thin film deposition techniques to form read tracks 38 and/or write tracks 40. Of course, read tracks 38 and write tracks 40 may be deposited on substrate 14 either before or after closure 12 is manufactured in accordance with the present invention. Then, a gap layer is applied to substantially the entire gap side surface 32 of closure 12. This pre-patterned gap layer on gap side surface 32 is then etched to selectively pattern the gap layer to form patterned gap layer 18 having the topography that inversely corresponds to the nonplanar topography of the recording track layer 16 as discussed above.

In particular, this selective gap layer deposition on gap side surface 32 of closure 12 can be performed in a vacuum deposition system having a thickness monitor to precisely control the thickness of the deposited patterned gap layer 18. The deposited patterned gap layer 18 may be photolithographically defined and subsequently etched to create the desired pattern. As closure 12 is aligned and bonded to substrate 14 in a closing process, the localized empty space in gap 20 is filled with patterned gap layer 18. Accordingly, closure 12 is completely supported by patterned gap layer 18 where air space would otherwise exist. Microchipping on closure 12 and corrosion pockets which exist in gap 20 itself can thereby be minimized or eliminated by utilization of tape head 10 formed by the method of the present invention.

By using the tape head 10 of the present invention, selective gap layer deposition on closure 12 is a way to reduce the empty space in gap 20. By selectively patterning the gap layer on closure 12, the nonplanar topography of recording track layer 16, which is due to the difference between the thickness of read tracks 38 and/or write tracks 40, can be compensated for.

It has been found that in tape head design having a closure with a flat gap side surface, the empty space associated with each write track is approximately 1,000 Å. This empty space in the gap between the substrate and the closure has been identified to produce a yield loss in manufacturing due to microchipping. Corrosion has also been found to be a problem source in tape heads of this type.

Although tape head 10 has been referred to as a magnetic recording tape head, it is within the scope of the invention to utilize the techniques of the present invention in other types of heads, because it is desirable for all heads to have reduced or eliminated tape head erosion and/or corrosion in the gap of the head.

In addition, although gap 20 is disclosed to include recording track layer 16 and patterned gap layer 18, it is within the scope of the invention that gap 20 may include additional or different gap layers.

Although tape head 10 is of an interleaved type where read tracks 38 are interleaved with write tracks 40, a read tape head having read tracks 38 only may also be used. Then, if tape head 10 comprises a read only tape head, read tracks 38 define off-track recesses. The recesses comprises localized empty space when substrate 14 is bonded to closure 12. This localized empty space is interposed between the base of the recesses and gap side surface 32 of closure 12. Patterned gap layer 18 may be etched accordingly to fill the off-track recesses.

Moreover, although this discussion relates to utilizing patterned gap layer 18 to fill localized empty space in gap 20 defined by read and/or write tracks 38 and 40, it is within the scope of the invention to fill any localized empty space in gap 20 caused by reasons others than those discussed above, by tailoring the topography of patterned gap layer 18 accordingly.

Furthermore, although read tracks 38 and write tracks 40 are shown as the type that are deposited on gap side surface 36 of substrate 14, it is within the scope of the invention to have gap side surface 36 configured to receive recessed read tracks 38 and/or write tracks 40.

The present invention overcomes the problems associated with having localized empty space along the gap in a tape head. As discussed earlier, Applicants found that a magnetoresistive tape head facilitates micro chipping and erosion along the gap because of the lack of support of the tape head structure in these areas. This erosion creates variations in the gap length, thereby reducing the performance and the life of the magneto resistive head. In addition, debris from the operating environment are introduced into this air space, thereby creating complications in performance, if not tape head failure. The present invention reduces or eliminates these problems.

While advantageous embodiments have been chosen to illustrate the invention, it will be understood by those skilled in the art that various changes and modifications can be made therein without departing from the scope of the invention as defined in the appended claims.

What is claimed is:

1. A magnetic recording head for at least one of reading from and writing to a medium moving across the head, comprising:

a substrate;

a closure separated from said substrate by a gap, wherein said closure has a substantially planar surface and is formed from a magnetic material;

a gap layer deposited on said substrate in said gap, said gap layer having a first nonplanar topography along said gap; and a patterned gap filler layer deposited on said substantially planar surface of said closure having a second topography along said gap that inversely corresponds to said first nonplanar topography such that said gap between said substantially planar surface of said closure and said gap layer is substantially filled by said patterned gap filler layer.

2. A magnetic recording head according to claim 1, wherein said gap layer comprises a recording track layer.

3. A magnetic recording head according to claim 2, wherein said recording track layer comprises at least one of a read track and a write track.

4. A magnetic recording head according to claim 1, wherein said gap layer comprises a read trace having a first thickness, and a write track having a second thickness less than said first thickness and a gap side surface, wherein said patterned gap filler layer has a third thickness substantially equal to a distance between said write track gap side surface and said closure.

5. A magnetic recording head according to claim 1, wherein said gap layer comprises a read track having a first thickness substantially equal to a thickness of said gap wherein said read track defines an off-track recess in said gap layer having a second thickness, and wherein said patterned gap filler layer has a thickness equal to said second thickness.

6. The magnetic tape lead of claim 1 wherein said patterned gap filler layer comprises said closure having the substantially planar surface etched to form the second topology.

7. A magnetic tape head for reading from and writing to a magnetic tape moving across the head, comprising:

a substrate having a gap side surface;

closure having a substantially planar gap side surface that opposes and is separated from said gap side surface of said substrate by a gap, said closure formed from a magnetic material;

a gap layer deposited on said gap side surface of said substrate in said gap, wherein said gap layer has a first nonplanar topography along said gap defining a recess between the gap layer and the substantially planar side of said closure having a first thickness; and a patterned gap filler layer deposited on said substantially planar gap side surface of said closure in said gap, wherein said patterned gap filler layer has a second topography along said gap that inversely corresponds to said first nonplanar topography thereby defining a portion corresponding to said recess and having a second thickness substantially equal to the first thickness.

8. A magnetic tape head according to claim 7, wherein said gap layer comprises a recording track layer.

9. A magnetic tape head according to claim 8, wherein said recording track layer comprises at least one of a read track and a write track.

10. A magnetic tape head according to claim 7, wherein said gap layer comprises a read track having a read track thickness, and a write track having a gap side surface and a write track thickness less than said read track thickness, wherein said recess is juxtaposed to said gap side surface of said write track.

11. The magnetic tape head of claim 7 wherein said patterned gap filler layer comprises said closure having the substantially planar surface etched to form the second topology.

* * * * *